United States Patent [19]
Arnott

[11] Patent Number: 6,081,879
[45] Date of Patent: Jun. 27, 2000

[54] DATA PROCESSING SYSTEM AND VIRTUAL PARTITIONING METHOD FOR CREATING LOGICAL MULTI-LEVEL UNITS OF ONLINE STORAGE

[75] Inventor: Randy Marc Arnott, Mont Vernon, N.H.

[73] Assignee: Adaptec, Inc., Milpitas, Calif.

[21] Appl. No.: 08/963,899

[22] Filed: Nov. 4, 1997

[51] Int. Cl.[7] .................................................. G06F 12/00
[52] U.S. Cl. ........................ 711/173; 711/206; 711/114
[58] Field of Search ................................ 711/173, 153, 711/129, 122, 203, 206, 207, 209, 114, 170; 707/205; 710/10, 8, 13, 74; 709/301

[56] References Cited

U.S. PATENT DOCUMENTS

| 5,568,629 | 10/1996 | Gentry et al. | 711/114 |
| 5,675,769 | 10/1997 | Ruff et al. | 711/173 |
| 5,721,858 | 2/1998 | White et al. | 711/203 |
| 5,829,053 | 10/1998 | Smith et al. | 711/173 |
| 5,930,831 | 7/1999 | Marsh et al. | 711/173 |

Primary Examiner—Glenn Gossage
Attorney, Agent, or Firm—Cesari and McKenna, LLP

[57] ABSTRACT

A data processing computer system and virtual partitioning method for creating a multi-level container in the computer system are disclosed. The computer system enables the creation of multi-level containers including primary and secondary containers without including specific knowledge of the primary containers in the secondary containers. The computer system builds the primary containers in a container structure and stores the partition structures for the primary containers in Partition Table entry. Then, if primary containers are part of a multi-level container structure, the system builds a virtual partition that represents these primary containers are thereafter created from these virtual partitions. The virtual Partition Table structure for the secondary containers includes pointers to the entry points of the primary container drivers. By storing only pointers to the primary container drivers in the secondary container's partition structures, the computer system enables a method for creating multi-level containers without including specific knowledge of the primary containers in the secondary container's partition structures and uses the same method to create single-level containers and multi-level containers. The computer system includes an input/output (I/O) unit or subsystem that configures storage devices into multi-level containers by copying partition structures for primary containers into the partition table and that enables reconfiguration of storage devices into containers while still online.

5 Claims, 7 Drawing Sheets

DATA PROCESSING SYSTEM AND VIRTUAL PARTITIONING METHOD FOR CREATING LOGICAL MULTI-LEVEL UNITS OF ONLINE STORAGE

FIELD OF THE INVENTION

The invention relates generally to the field of computer systems and more particularly provides a method for configuring computer systems' storage devices into logical multi-level units of storage space on more than one on-line disk (e.g. a disk currently involved in runtime operations in the computer system).

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The applications address those storage devices in terms of the names of files which contain the information to be sent to or retrieved from the applications. A file system, which is a component of the operating system, translates the file names into logical addresses in the storage subsystem. The file system forwards the (I/O) requests to an I/O subsystem which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. A mirror set is composed of volumes on multiple disks, whereby a volume on one disk is a duplicate copy of an equal sized volume on another disk in order to provide data redundancy. A RAID implementation is a collection of partitions, where each partition is composed of space from more than one disk in order to support data redundancy.

In a prior system, the I/O subsystem configures the containers through a software entity called a "container manager." Essentially the container manager sets up a mapping structure to efficiently map logical addresses received from the file system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the (I/O) subsystem's container manager configures the containers and maintains the configuration tables in a container layer of the I/O subsystem. In accordance with a copending U.S. patent application, Ser. No. 08/964,304 titled, File Array Storage Architecture by Richard Napolitano et al., the container layer of the I/O subsystem comprises a Device Switch Table, a Container Array, and a Partition Table. The Device Switch Table consists of entries, each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When a software process issues an I/O request, the file system accepts the file-oriented I/O request and translates it into an I/O request bound for a particular device. The file system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

In the container configuration described above, by building the Partition Table entry for each container, the system configures each container to directly access physical disks drives. This type of container configuration is acceptable in single-level container structure where all containers directly access disk drives. However, in multi-level container structures where higher-level or secondary containers access disk drives through lower level or primary containers, this type of container configuration is unacceptable. For multi-level container structures, in the above-described configuration, each secondary container driver must have specific knowledge of the type primary containers in the container structure and how the primary containers access physical disk drives. This causes the system to use a different method for configuring multi-level containers than it does for single-level containers and it also causes the system to tailor secondary container drivers to the container structure being implemented. Such tailoring of secondary container drivers leads to process redundancy and it becomes difficult to maintain and upgrade such drivers during software development. Therefore, it is an object of the present invention to provide a method for configuring multi-level containers which is the same as the method for configuring single-level containers whereby, the system creates drivers for secondary containers without specific knowledge of the types and functions of primary containers in the container structure.

Yet another object of the present invention is to provide a method of routing processing (I/O) requests in the secondary containers to primary containers that have direct access to physical storage devices on which the I/O requests are stored.

SUMMARY OF THE INVENTION

According to the invention, the system builds the primary containers in a container structure and stores the partition structures for the primary containers in a Partition Table. Then, if primary containers are part of a multi-level container structure, the system builds a virtual partition that represents these primary containers and inserts the virtual partition in the Partition Table. Secondary containers are thereafter created from these virtual partitions. The virtual Partition Table structure for the secondary containers includes pointers to the entry points of the primary container drivers. By storing only pointers to the primary container drivers in the secondary container's partition structures, the system enables a method for creating multi-level containers without including specific knowledge of the primary containers in the secondary container's partition structures and uses the same method to create single-level containers and multi-level containers.

Specifically, during container configuration, the configuration process builds the primary containers that have direct access to disk drives whereby, the system reads the partition structures from physical disk drives, stores these partition structures into Partition Table entries and builds the primary containers from the partition structures. If the primary containers are part of a multi-level container structure, the configuration process creates virtual partitions that represent the primary containers and inserts the virtual partitions in Partition Table entries. The configuration process creates secondary containers from the virtual partition structures. Since the secondary containers do not go directly to the disk drives, the configuration process stores pointers to the entry points of the primary container drivers in the secondary container's virtual partition structure. The system continues to create virtual partition structures and to build the higher level containers until there are no remaining higher level containers in the container structure.

Mapping each higher level container to the entry points of lower level containers drivers enables construction of multi-level containers without changing the higher container drivers. Thus each container in the container structure maps either to physical storage devices or to lower level container drivers which eventually map to physical storage devices.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
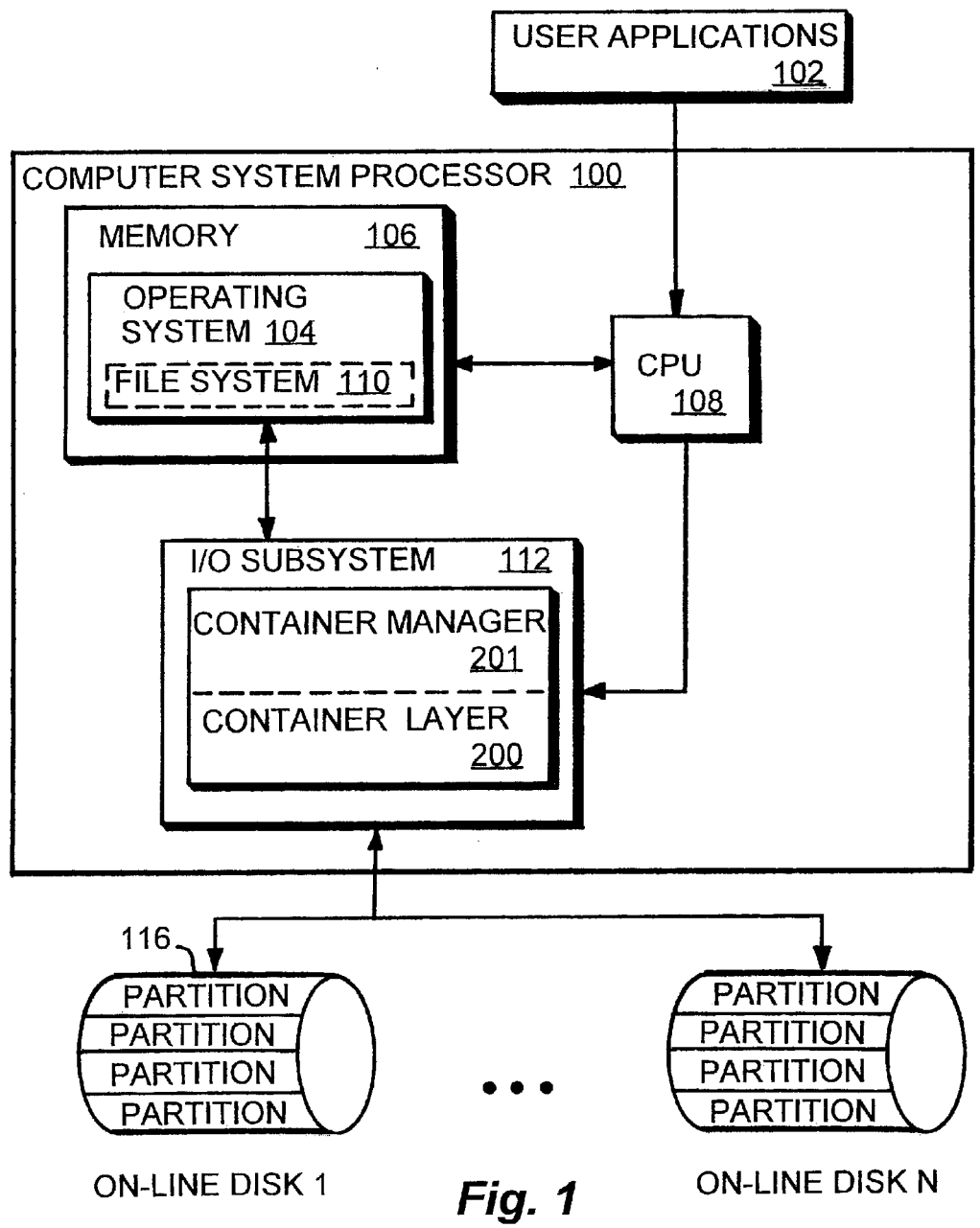
FIG. 1 is a schematic block diagram of a computer system configured to perform on-line storage configuration in accordance with the present invention.

FIG. 1 is a schematic block diagram of a typical computer system that is configured to perform on-line storage configuration in accordance with the present invention. The computer system processor 100 comprises a memory 106 and an input/output (I/O) subsystem 112 interconnected with a central processing unit (CPU) 108. The memory 106 comprises storage locations addressable by the CPU 108 and (I/O) subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set of on-line storage devices 116. These on-line storage devices 116 are partitioned into units of physical space associated with the inventive multi-level container configuration described herein.

User applications 102 and internal processes in the computer system invoke I/O requests from the operating system 104 by file names. A file system 110, which is a component of the operating system 104, translates the file names into logical addresses. The file system 110 forwards the I/O requests to an (I/O) subsystem 112 which, in turn, converts the logical addresses into physical locations in the storage devices 116 and commands the latter devices to engage in the requested storage or retrieval operations. The (I/O) subsystem 112 configures the partitions of the physical storage devices 116 into containers and stores container configuration tables in the container layer 200 of the (I/O) subsystem 112. The (I/O) subsystem 112 also has a container manager 201 associated therewith to perform configuring of containers, and to track configured containers as described generally above. Container configuration enables the system administrator to partition a disk drive into one or more virtual disks.

Figure 2A:
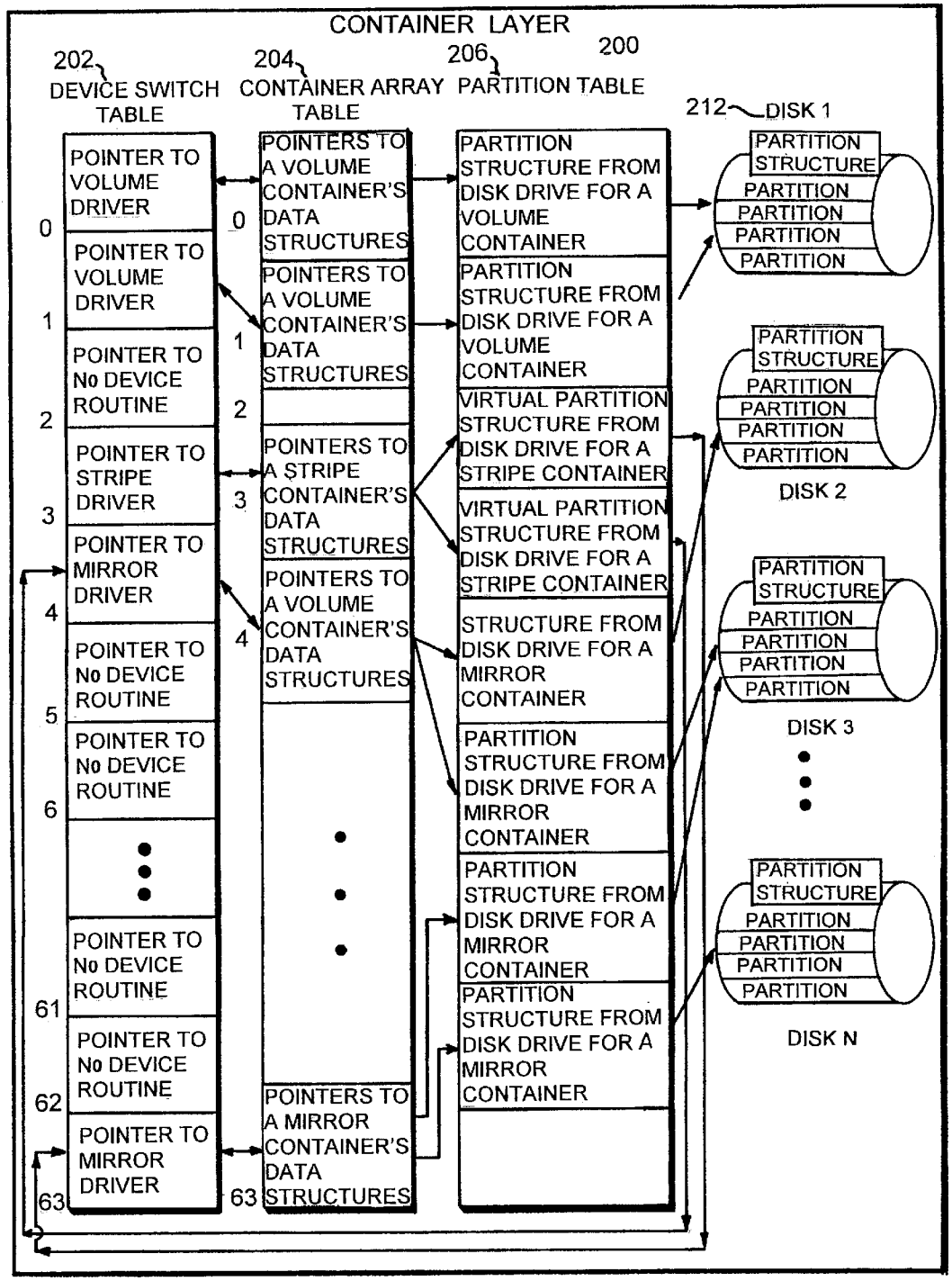
FIGS. 2A and 2B together depict a schematic block diagram illustrating a container layer of an (I/O) subsystem.
Figure 2B:
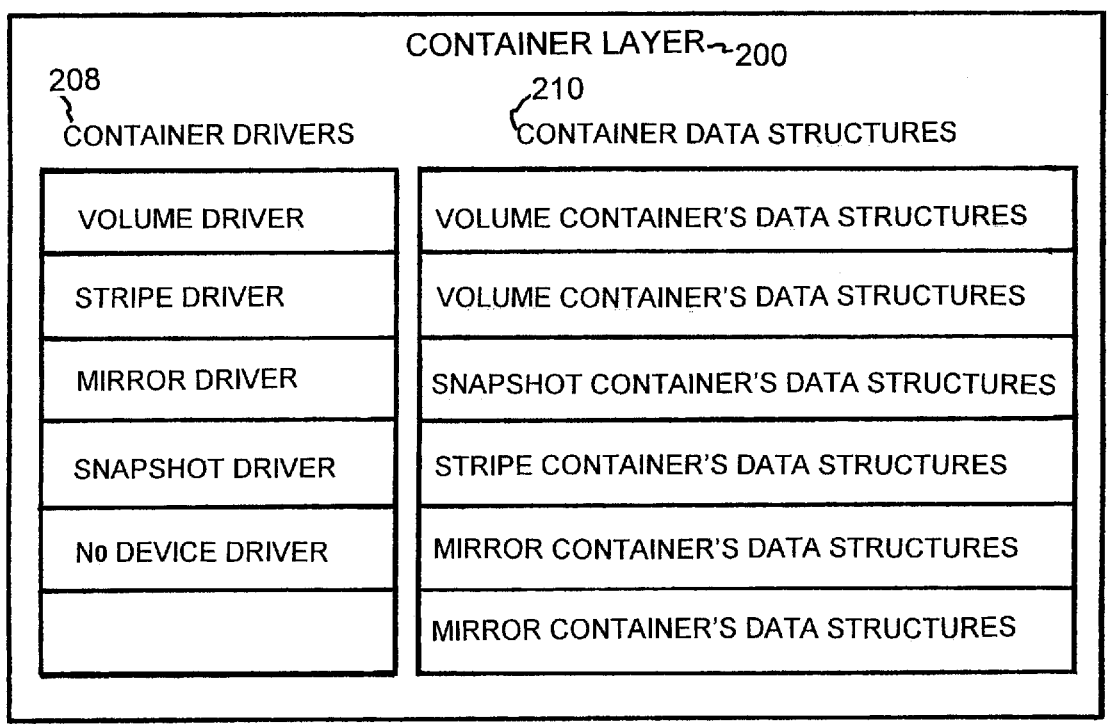

FIGS. 2A and 2B together depict the container layer 200 of the I/O subsystem 112 which comprises a Device Switch Table 202, a Container Array Table 204, and a Partition Table 206. The Device Switch Table 202 consists of entries, each entry pointing to the entry point of a container driver 208 (FIG. 2B) which performs I/O operations on a particular type of container. If an entry of the Device Switch Table 202 does not contain a pointer to a container driver 208, the entry will contain a pointer to a "No Device" routine, which in turn, returns an error when invoked to process I/O requests. The Container Array Table 204 is a table of entries, each of which ordinarily points to data structures 210 used by the container drivers 208. There is a fixed one-to-one relationship between entries of the Device Switch Table 202 and entries of the Container Array Table 204. The Partition Table 206 contains partition structures copied from disk drives 212 for each container on the system. The partitions enable the container driver to access physical locations in the disk drives.

During container configuration, the configuration process in the container layer 200 reads the partition structures of the disk drives 212, and copies the partition structures into Partition Table entries. The configuration process creates one Partition Table entry for each partition structure in a container. After building the Partition Table entries for a container, the configuration process builds the container's data structures 210 and stores pointers to the data structures 210 and the associated Partition Table entries in the Container Array Table entry. Then the configuration process loads a pointer to the entry point of the appropriate container driver 208 into the Device Switch Table entry. In other container configuration processes, containers in the Container Layer 200 must have direct access to physical disk drives. They cannot access disk drives by calling other container drivers 208 with direct access to these disk drives.

The invention therefore comprises a method of configuring multi-level containers where the secondary containers in the container structure have no specific knowledge of the primary containers or how the primary containers access physical disk drives. According to the invention, during container configuration, the configuration process copies partition structures from physical disk drives into Partition Table entries for each primary containers in the container structure. Then the configuration process builds the primary containers by building primary containers'data structures 210 and storing pointers to the data structures 210 and the associated Partition Table entries in Container Array Table entries. After this, the configuration process loads pointers to the entry points of the appropriate container drivers 208 in the Device Switch Table entries. If the primary containers are part of a multi-level container structure, the configuration process builds a virtual Partition Table entry that represents the primary containers. The configuration process thereafter builds the secondary containers in the container structure by building the containers'data structures 210 and storing pointers to the data structures and the associated virtual Partition Table entries in the Container Array Table 204. Then the configuration process loads pointers to the entry points of the appropriate container drivers in the Device Switch Table entries. Since the secondary containers do not go directly to the disk drives, the configuration process stores pointers to the entry points of the primary container drivers in the secondary containers'virtual partition structure. The configuration process continues to build higher level containers until there are no remaining secondary containers in the container structure.

Figure 3A:
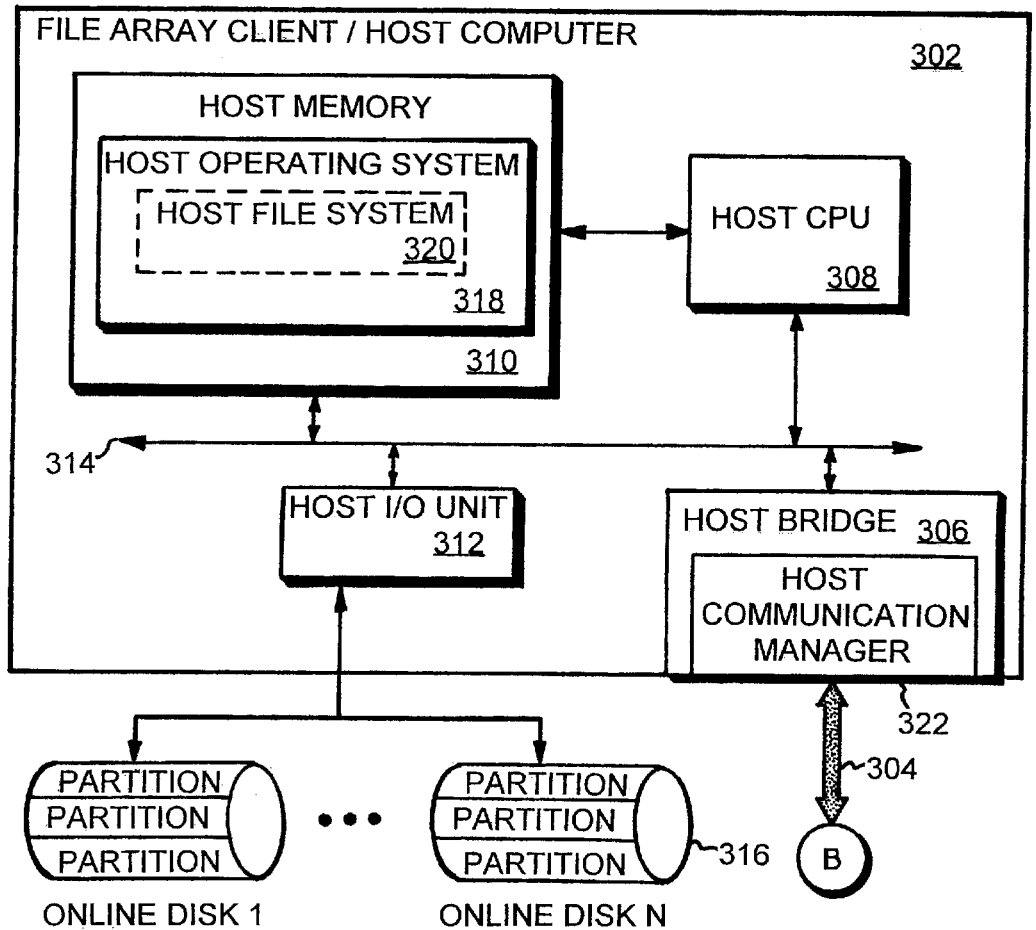
FIGS. 3A and 3B together illustrate preferred embodiment of a data processing system having a distributed file system architecture configured to implement the multilevel container configuration.
Figure 3B:
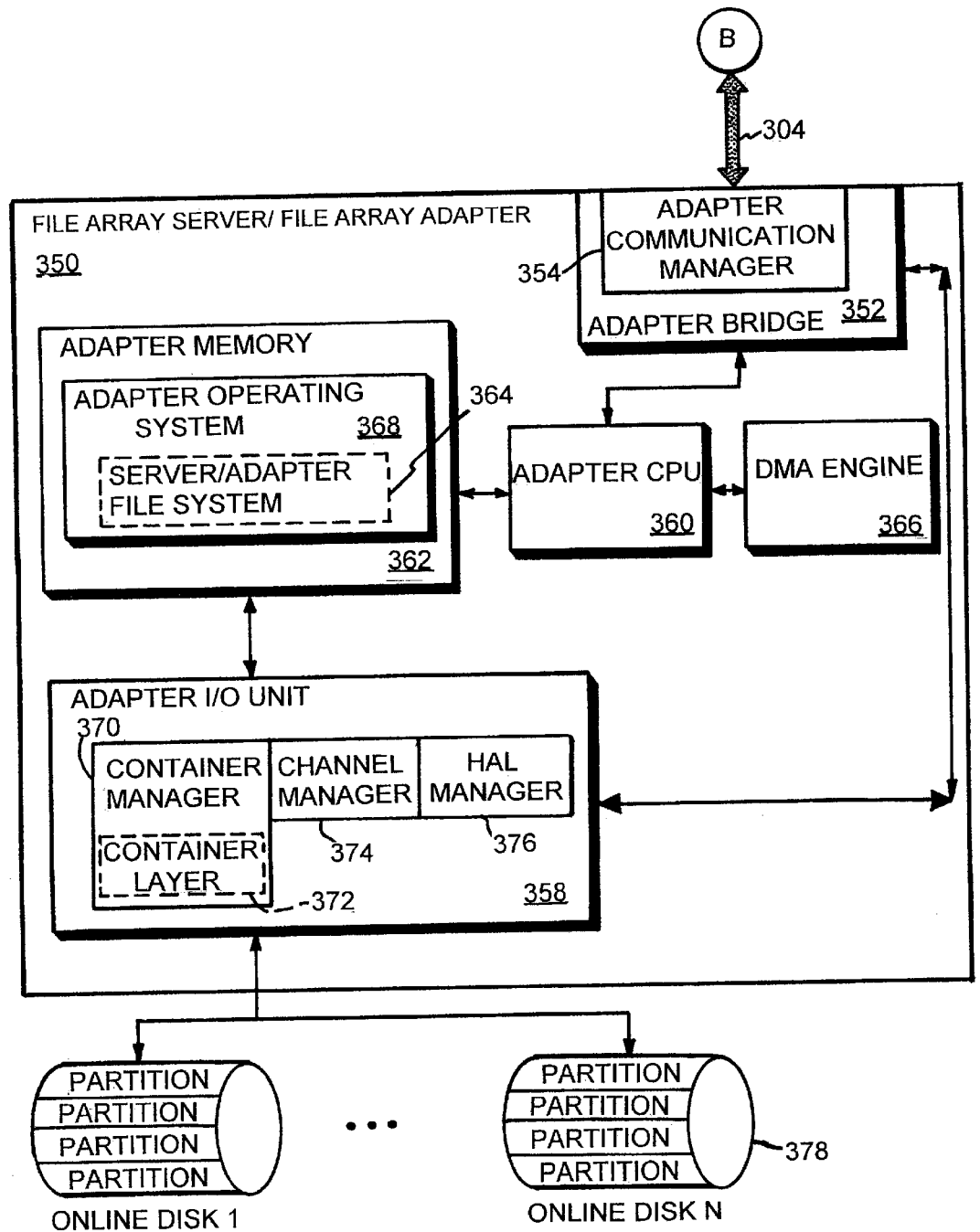

FIGS. 3A and 3B together depict an illustrative embodiment of a data processing platform having a distributed file system architecture configured to implement the on-line container reconfiguration method. The data processing platform comprises a host computer 302 coupled to a file array adapter 350 (FIG. 3B) over a low-latency interface 304. The low-latency interface 304 is preferably a peripheral component interconnect (PCI) bus that connects to the host computer 302 through a host bridge 306 and to the adapter 350 through an adapter bridge 352. It should be noted that other interfaces may be used with the present invention.

The host computer 302 comprises a host central processing unit (CPU) 308, a host memory 310, and a host input/output (I/O) unit 312 interconnected by a system bus 314. The host I/O unit 312 is connected to a set of on-line storage devices 316. The host operating system 318, portions of which are typically resident in host memory 310 and executed by the host CPU 308, functionally organizes the host computer by, inter alia, handling I/O requests. The host file system 320, a component of the host operating system 318, interfaces with the host communication manager 322 within the host bridge 306 which exchanges (I/O) requests and responses over the interface 304 with adapter communication manager 354 within the adapter bridge. The host operating system 318 is preferably the Windows NT® operating system (hereinafter "Windows NT") developed by Microsoft Corporation of Redmond, Wash. Windows NT incorporates an (I/O) system that delivers I/O requests to file systems and returns results to applications. File systems are viewed by Windows NT as sophisticated device drivers that can be dynamically loaded into the operating system. The file array adapter 350 thus "plugs into" the Windows NT operating system, and as a result, an adapter I/O unit 358 generally replaces the Windows NT host (I/O) system. It should be noted, however, that the invention described herein may function on any operating system.

The file array adapter 350 comprises an adapter CPU 360 coupled to an adapter memory 362 and an adapter file system 364, a component of the adapter operating system 368, portions of which are typically resident within memory 362 as illustrated in FIG. 3B. The adapter file system 364 interfaces with the adapter communication manager 354 and the adapter I/O unit 358. A direct memory access (DMA) engine 366 coupled to the adapter CPU 360 enables the file array adapter 350 to execute DMA operations with the host computer 302. The file array adapter 350 further includes an adapter I/O unit 358, which comprises the container manager 370 in the container layer 372, a channel manager 374 and a hardware abstraction layer (HAL) 376. The adapter I/O unit 358 is connected to a set of on-line storage devices (disk drives) 378. The channel manager 374 implements protocols for communicating with the disk drives 378 and, to that end, performs the functions of conventional device-specific drivers, such as small computer system interface (SCSI) drivers and port drivers. HAL 376 directly manipulates the hardware and insulates the software components from hardware details. The container manager 370, a software entity that configures containers, is independent of the adapter file system 364, thus, the file array adapter 350 can be used either as a file system controller or, in an alternate embodiment, as a block I/O controller. In this latter embodiment, the adapter file system 364 is bypassed and I/O requests occur directly between the communication manager and container manager.

Figure 4:
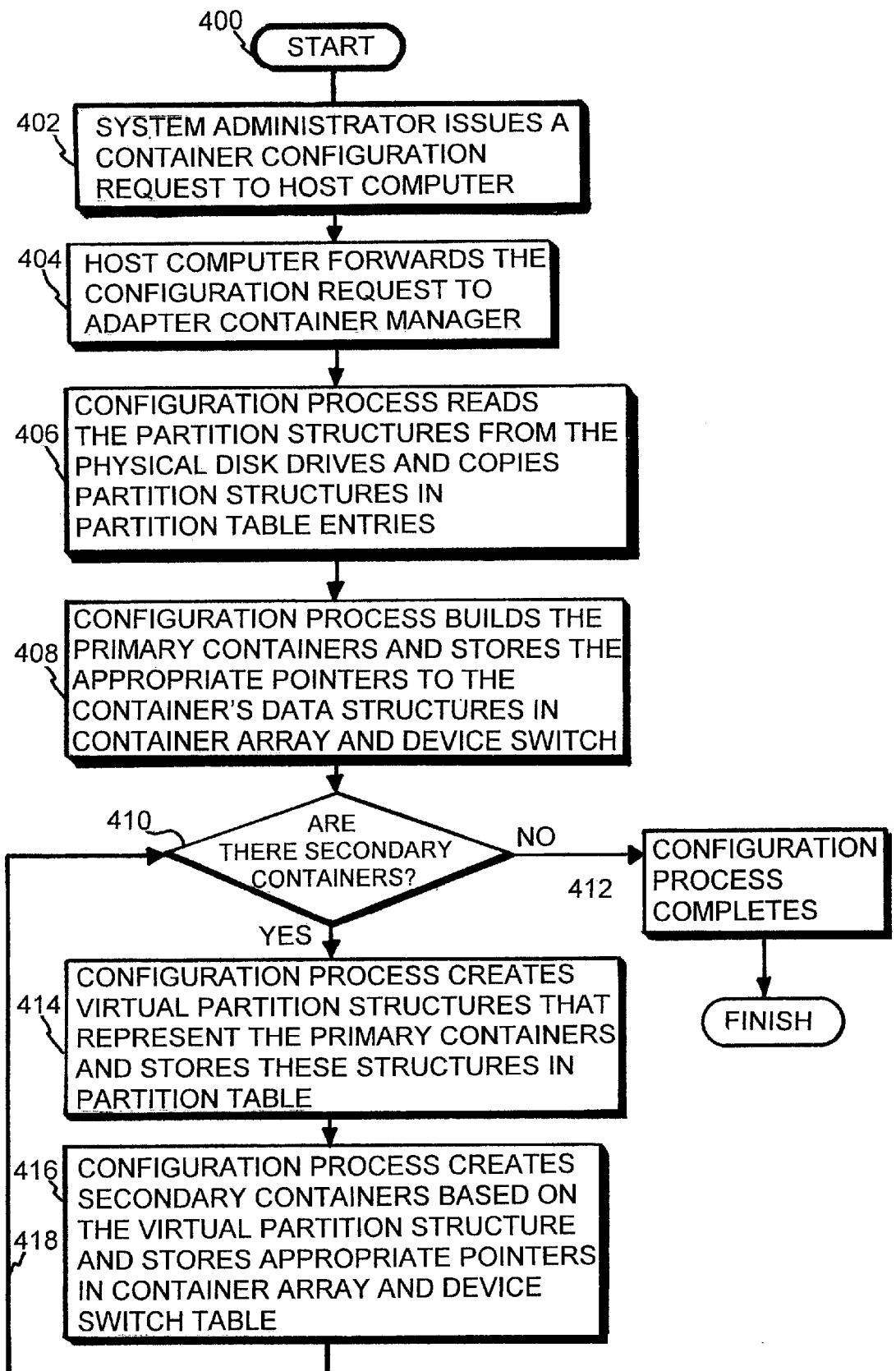
FIG. 4 is a flowchart illustrating the sequence of steps followed by a multi-level container configuration process in the preferred embodiment in FIG. 3.

FIG. 4 is a flowchart illustrating the sequence of steps employed when performing an on-line container reconfiguration on a distributed file system in accordance with the invention. The sequence starts at Step 400 and proceeds to Step 402 where the system administrator issues a container configuration request to the host computer 302. The host computer 302 forwards or sends the request directly to the adapter container manager 370 through the adapter communication manager 354 in Step 404. The container manager 370 accepts the configuration request and initiates the configuration process to configure the containers in the container structure. The configuration process reads the partition structures directly from the physical disk drives 212 and copies partition structures in Partition Table entries in Step 406. There is one Partition Table entry for each partition structure copied from the physical disk drive 212. Then the configuration process builds the primary containers in the container structure by building the containers'data structures 210 based on the Partition Table entries. The configuration process further builds the primary containers by also storing pointers to the data structures 210 and the associated Partition Table entries in Container Array Table and Device Switch Table entries. The configuration process thereafter loads pointers to the entry points for the appropriate container drivers 208 in the Device Switch Table entries in Step 408. If the container structure is a multi-level structure, i.e. if there are secondary containers (Step 410), then the configuration process builds virtual partition structures that represent the primary containers based on the virtual partition structure in the multi-level container structure and stores these structures in Partition Table entries in Step 414. The configuration process builds the secondary containers and stores the appropriate pointers in the Container Array Table entries and the Device Switch Table entries in Step 416. The configuration process continues creating secondary containers (via return branch 418) until all containers in the multi-level container structure are created, and the configuration process completes in Step 412.

Figure 5:
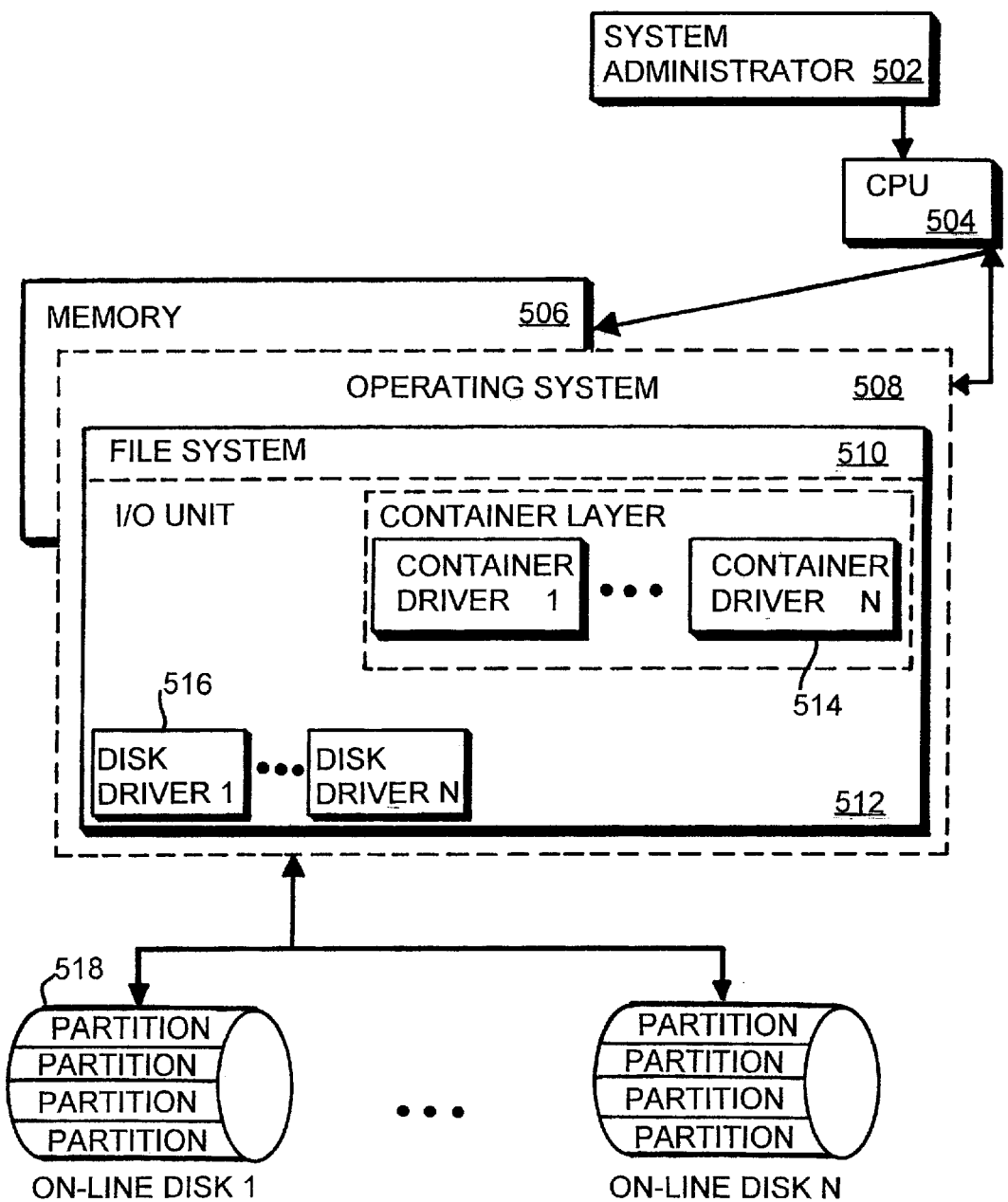
FIG. 5 illustrates an alternative embodiment of a data processing system configured to implement the multi-level configuration process.

While there has been shown and described an illustrative embodiment of a mechanism that enables container reconfiguration, it is to be understood that various other adaptations and modifications may be made within the spirit and scope of the invention. For example, in an alternate embodiment of the invention, the file system and the I/O unit of the data processing platform need not be distributed but may, in fact, be resident on the host computer. FIG. 5 depicts such an alternative embodiment of a data processing platform configured to implement the container configuration mechanism. An example of this file system is the Windows NT® File System (NTFS), available from Microsoft Corporation of Redmond, Wash., configured to operate on the Windows NT operating system. The depicted embodiment includes a CPU 504 which receives requests from user applications. The CPU communicates with the memory 506 and the operating system 508. Contained within the operating system is the file system 510 and an I/O unit 512. The I/O unit 512 includes a container layer driver set 514 consisting of Container Driver 1-N. The I/O unit 512 also contains a set of disk drivers 516 consisting of Disk Driver 1-N. The operating system communicates with partitioned on-line disks 1-N (518).

When the user applications 502 issues a configuration request to the CPU 504, the I/O Unit 512 takes over the configuration request and services the user's request.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of creating a multi-level container in a computer system, the multi-level container being configured from physical disk drives in the computer system and comprising a primary container arranged to have direct access to the physical disk drives and a secondary container arranged so as to be free of direct access to the physical disk drives, said method comprising the steps of:

reading a partition structure from the physical disk drives;

copying the partition structure from the physical disk drives to a partition table;

storing the partition structure in the partition table as a partition table entry;

building data structures for the primary container;

storing pointers to the data structures and partition table entries associated therewith in a container array table;

storing a pointer to an entry point of a primary container driver that processes input/output (I/O) requests on the primary container in a device switch table;

creating a virtual partition entry that represents the primary container; and building the secondary container from the virtual partition entry.

2. The method of claim 1 wherein the step of building the secondary container comprises the steps of:

storing the virtual partition entry in a partition table entry;

building data structures for the secondary container;

storing pointers to the data structures for the second container and the virtual partition entry in the container array table; and storing a pointer to an entry point of a secondary container driver which processes I/O requests on the secondary container in the device switch table.

3. The method of claim 2 wherein the step of creating the virtual partition entry comprises the step of storing a pointer to an entry point of the primary container driver in the virtual partition entry for the secondary container.

4. The method of claim, 3 wherein one partition table entry is created for each partition structure in the primary container.

5. A data processing system comprising:

a storage device divided into partitions, said partitions configured into a multi-level container, the multi-level container including a primary container that has direct access to the storage device and a secondary container that is free of direct access to the storage device;

a partition table which stores partition structures copied from the storage device;

a container driver for processing input/output (I/O) requests directed to the multi-level container;

a device switch table which contains a pointer to an entry point of the container driver;

a container array table having entries which contain pointers to data structures used by the container driver, wherein each of the entries in the container array table has an associated entry in the device switch table; and I/O subsystem software that configures the storage device into the multi-level container by copying the partition structures for the primary container into the partition table, the I/O subsystem arranged to construct virtual partition structures in the partition table for the secondary container, each virtual partition entry containing a pointer to a primary container driver that processes I/O requests on the primary container in the device switch table;

wherein the data processing system can reconfigure the storage device into a multi-level container while the data processing system is online.

* * * * *